UNITED STATES PATENT OFFICE.

JOSEPH W. HAYS AND CHARLES W. HAYS, OF CHICAGO, ILLINOIS.

GAS-ANALYZING APPARATUS.

1,153,911.

Specification of Letters Patent. Patented Sept. 21, 1915.

Application filed July 17, 1913. Serial No. 779,547.

*To all whom it may concern:*

Be it known that we, JOSEPH W. HAYS and CHARLES W. HAYS, citizens of the United States, residing in the city of Chicago, county of Cook, and State of Illinois, have invented certain new and useful Improvements in Gas-Analyzing Apparatus, of which the following is a specification.

Our invention applies particularly to automatic apparatus and to automatic compensating devices whereby the variable factors of temperature, pressure, evaporation, condensation, etc., encountered in gas analysis, are rendered inoperative, or at least negligible.

It is of great importance where gas analysis is employed as a means of efficiency improvement in connection with steam boiler furnaces, ore roasting and reducing furnaces, etc., that the draft pressure be shown upon the same chart with the gas percentage records. To meet this requirement we have devised means in connection with our automatic analyzer whereby the furnace or chimney draft is registered by the same recording means employed to register the gas percentages.

We attain the objects of our invention by the means illustrated in the accompanying drawings, wherein similar letters and figures refer to similar parts throughout.

Figs. 5 and 5<sup>A</sup> show a fountain ink-feeding device employed on our recording gage, whereby certain inaccuracies in registering the pressures created by the analyzer are avoided.

Figure 1:
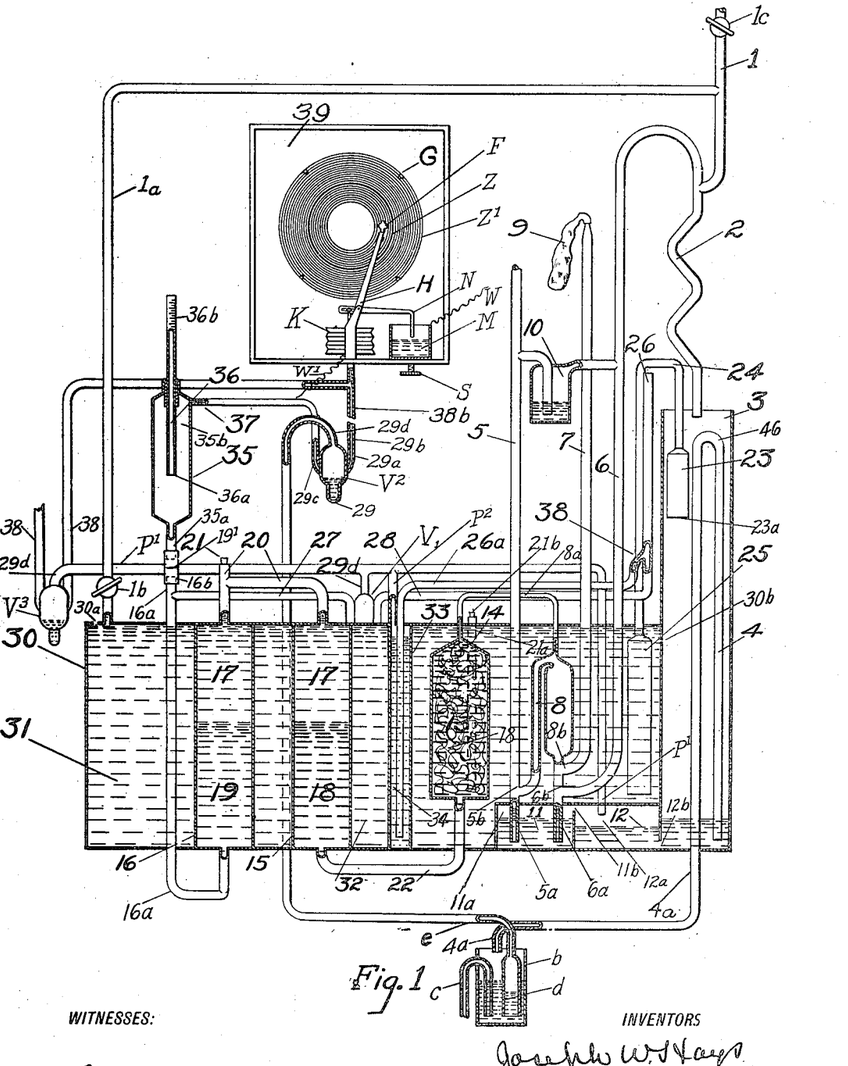
Figure 1 is a view of the analyzing apparatus, proper, shown principally in vertical cross-section.

In Fig. 1, the numeral "1" indicates a water supply pipe, through which water, preferably under constant pressure is conducted to the aspirator, 2. The flow of water may be regulated by a valve, $1^c$, or in any other practical manner. The water is discharged from 2 into the stand-pipe, 3, from whence it is periodically discharged by the siphon, 4. Gas is caused to flow from the source of supply, first through the filter shown in Fig. 6, thence through pipe 5, the measuring vessel, 8 and pipe 6, (Fig. 1) by the suction effect of the aspirator, 2. Pipe 7 connects with the gas-measuring vessel, 8 and is closed to the atmosphere by the distensible and collapsible bag, 9. The liquid by-pass valve, 10, connects pipes 5 and 6. The tubes, $5^a$ and $6^a$, lead downward from 8 into the chamber, $11^a$, and have their open ends submerged in the liquid, 11, which is preferably distilled water. The chamber, $11^a$, is entirely closed except for the opening, $11^b$, leading into the chamber, $12^a$, and the latter is entirely closed except for the aperture, $12^b$, and the pressure tube, $P^1$. The gas-measuring vessel, 8, communicates by a small bore tube with the absorber vessel, 14, the latter by tube 22 with vessel 15, this in turn by tube 20 with vessel 16 and the last named by tube $16^a$ with vessel 35. Vessel 14 is packed with a filtering or straining material, preferably of a fibrous character, as, for example, steel wool. The function of this material, 13, is two-fold. A liquid chemical 18 fills vessel 14 and the lower part of 15. The liquid 17 in vessels 15 and 16 is a light oil and the liquid 19 in 16 and $16^a$ is preferably distilled water. When gas is forced over into 14 from 8, 18 is displaced and in turn displaces 17 which in its turn displaces 19. When 18 is displaced the fibers of 13 are left covered with the chemical solution and a relatively large area of absorption surface is offered to the incoming gas. The fibers further serve the office of breaking up the gas body as it enters 14 and in a sense stirring the gas, thereby bringing every gas molecule into contact with absorption surfaces. The plug, 21, affords facilities for introducing the oil, 17, and the tube, $21^a$, which is closed by the plug, $21^b$, facilities for introducing and removing the absorber liquid from 14.

The tank, 30, incloses the parts, 8, 14, 15 and 16 and is filled with water, 31. The bell, 23, in the stand-pipe, 3, communicates by tube, 24, with the bell, 25, which is submerged in the water, 31. The tube, 26, which is open at the top to the atmosphere, has an overflow, 38, into a tube, $26^a$, which communicates with the bottom of reservoir, 33, which is filled with distilled water, 34. The tank, 30, may be entirely closed except for an air vent at any desired place, as for example, $30^a$. For facilitating the filling of the tank, 30, the tube, $1^a$, provided with the valve, $1^b$, may be connected with the pipe, 1, as shown and if it is desired to keep water constantly flowing through the tank an opening, $30^b$, may be provided to permit the escape of water from 30 into 3.

The tube, $P^1$, leads from the top of chamber $12^a$ to the pressure connection, $29^d$, of the valve, $V^1$ and thence to a similar pressure connection, $29^d$, of the valve, $V^3$. The tube, 36, in the preferred construction, is adjustably fixed in the top of 35 and is open at both ends. Tube 37, leads to the valve, $V^2$, and $38^b$ from the connection $29^b$ of the valve $V^2$ to the bellows connection of the recording gage in Fig. 1 at 39 as shown. The tube $38^a$ is T-connected with $38^b$ and runs to the valve, $V^3$, as shown.

The recording gage may be of any type desired if suitable for registering low pressures. We prefer a gage of the spring bellows type shown in Fig. 1 at 39 and adapted to record both positive and negative pressures. This gives us a gage that will record both draft pressures and gas percentages, the draft or negative pressure being taken through the tube 38 and the valve, $V^3$, and being registered on the chart inside of the neutral or zero line, Z. The positive pressure, which is inversely as the percentage of gas absorbed, is taken through the valve, $V^2$, and the tubes 37 and $38^d$, from the pressure chamber 35.

In Fig. 1, K is the bellows spring which under either positive or negative pressures communicates movement to the pen arm, H, by means of a link and lever arrangement or in any other practical manner. The chart, G, is rotated by suitable clock work. The pen moves from Z toward the center of the chart under negative pressures and from Z toward the periphery of the chart under positive pressures. The cup, M, is partly filled with mercury and is adjustably fixed by the screw, S. The wire, N, moves toward the mercury when the pen moves toward the periphery of the chart and the contrary. The screw, S, makes it possible by raising or lowering the mercury to secure contact between the mercury and the wire, N, when the pen is at any desired position on the chart. The arrangement is such that when contact is made an electrical circuit is completed through the wires, W and $W^1$, and an annunciator caused to ring.

Figure 2:
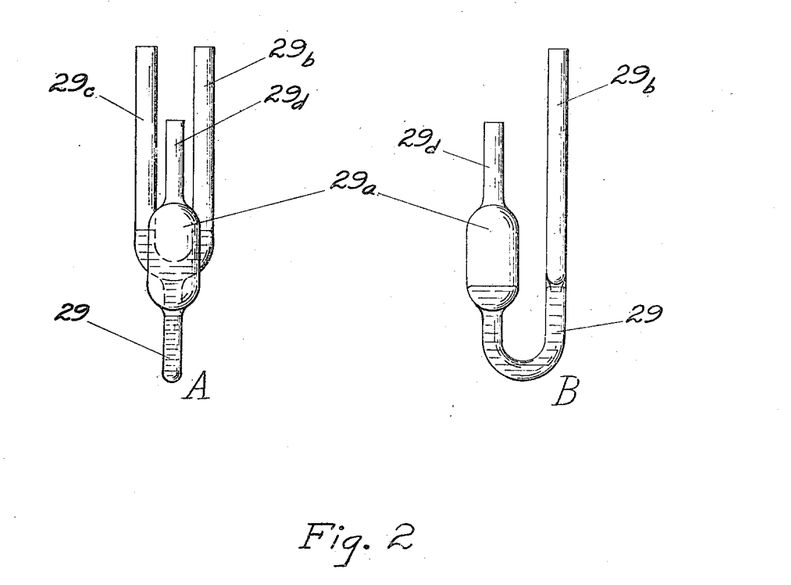
Fig. 2 shows front and side views of a liquid valve, several of which are employed upon the apparatus.

In Fig. 2 is shown the liquid valve used on the apparatus at $V^1$, $V^2$ and $V^3$. Fig. $2^A$ shows the valve in the closed position, front view, and Fig. $2^B$ in the open position, side view. We prefer to use mercury in these valves, but other liquids may be employed if desired. When the pressures are near equal on both sides of the seal, 29, communication is open between $29^b$ and $29^c$. When sufficient pressure is applied through $29^d$ to the mercury in $29^a$ it is displaced therefrom into $29^b$ and $29^c$, sealing these tubes from communication with each other. When the pressure is released the mercury returns to its normal position, and communication between the tubes is reëstablished.

Figure 3:
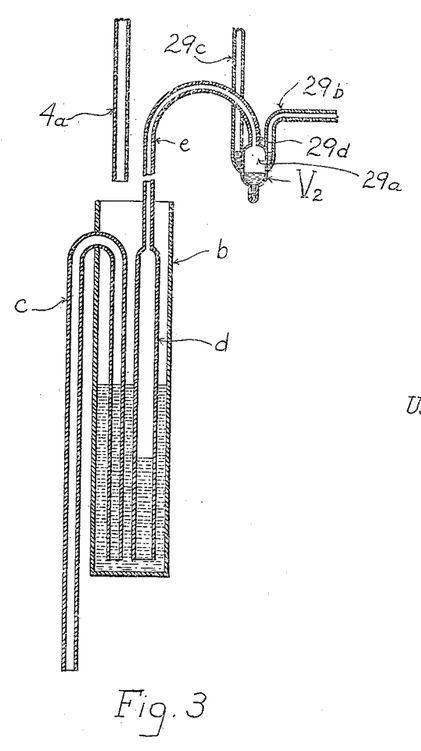
Fig. 3 shows the apparatus for actuating one of the several liquid valves employed.

The apparatus for actuating the valve, $V^2$, is shown in Fig. 3. The tank, $b$, receives water periodically from the pipe $4^a$ of the siphon 4 and when filled discharges the water through the siphon $c$. When $b$ is filling the water rises in $d$, compressing the air therein and forcing same through $e$ into $29^a$, displacing the mercury and closing the valve. When $d$ is emptied by $c$, the pressure is relieved and the contrary valve operation takes place. Valves $V^1$ and $V^3$ are closed by air pressure in a similar manner, the pressure being taken through the tube $P^1$ from the chamber $12^a$, Fig. 1.

Figure 4:
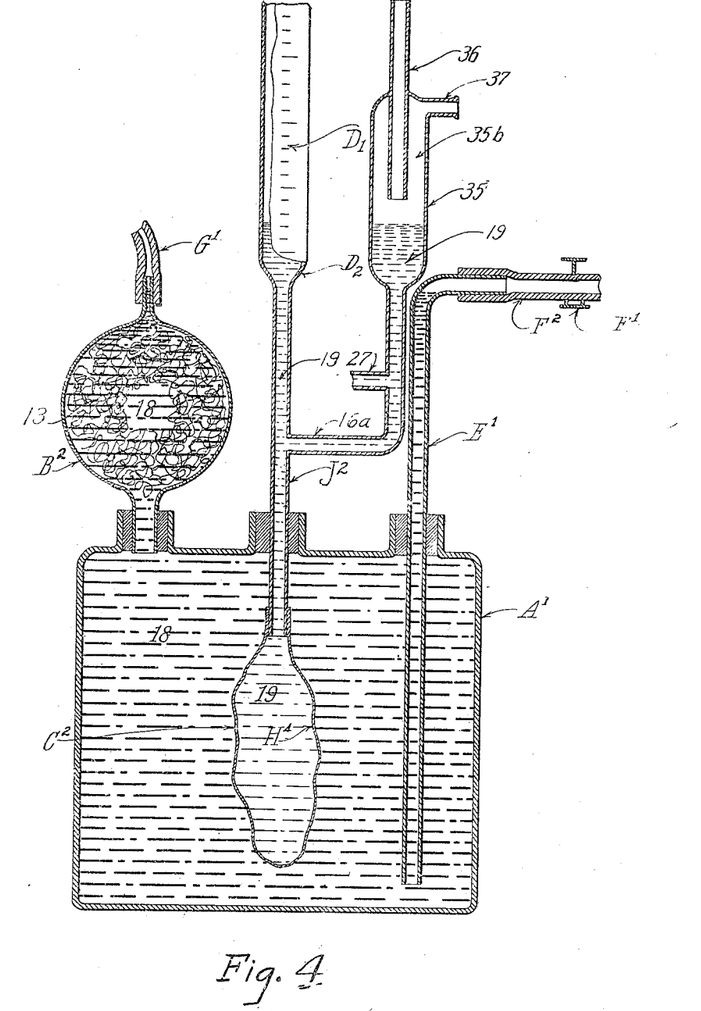
Fig. 4 shows an alternative means for communicating pressure from one fluid to another.

In Fig. 4 we show an alternative device which we have used very successfully in substitution for the parts 14, 15 and 16, with their connecting tubes, shown in Fig. 1. The problem is that of communicating pressure from one fluid to another with negligible friction while preserving each fluid from contact with the other. In the device as shown in Fig. 4, $A^1$ is a closed vessel, $B^2$ is a bulb packed with a fibrous material, 13, preferably steel wool. $H^4$ is a collapsible bag, preferably of rubber, attached to the tube $J^2$, which is in turn connected with the tube $D^2$ on which there may be a scale, $D^1$. $J^2$ is T-connected with the tube $16^a$ below its point of juncture with tube 27. $E^1$ is a tube for filling and emptying the vessel $A^1$. $F^2$ is a rubber tube which may be closed by the clamp, $F^1$. $G^1$ is a rubber tube through which connection is made with the tube $8^a$ of the gas measuring vessel, 8, Fig. 1. The bag, $H^4$, and the tube $J^2$ are filled with distilled water, 19. When gas is forced from 8 upon the liquid chemical 18, in $B^2$, the liquid is displaced from $B^2$ into $A^1$ and the bag, $H^4$, is deflated by the amount of such displacement, the water, 19 being forced therefrom upward into and through $J^2$. The quantity of this displacement is measured by the scale $D^1$ and will be less than normal according to the quantity of the measured gas sample absorbed by the liquid 18. The gaskets by means of which $B^2$, $J^2$ and $E^1$ are connected with $A^1$ are of course air and liquid tight and the clamp, $F^1$, is normally closed.

Figures 5, 5A:
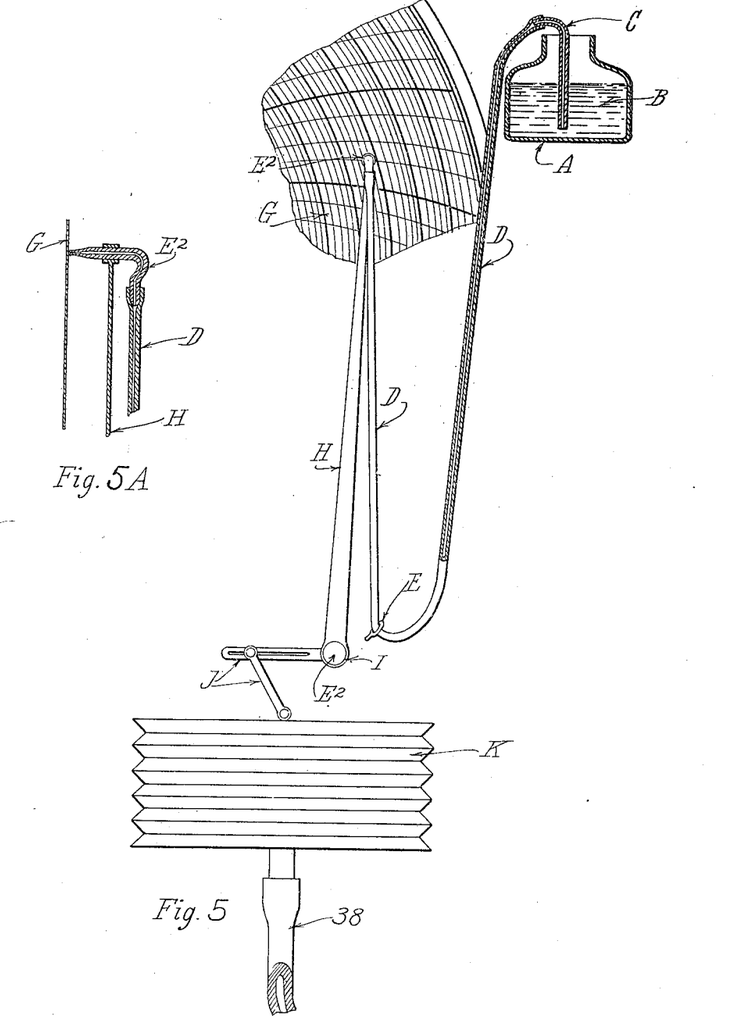

In Figs. 5 and $5^A$ we show the application of a fountain ink-feeding device to our recording gage, which is quite essential to the satisfactory working of our apparatus. Gas samples are taken and analyzed at intervals of about three minutes and a record of each analysis is made by a stroke of the pen, $E^2$, upon the chart G,—a total of some 480 pen strokes in 24 hours. A relatively large quantity of ink is required for these records and it has proved impractical to carry the required quantity in the pen itself. In Fig. 1 we show a pen having the usual type of ink bowl, with which our first experiments were made. It will be noted that in making a record the pen moves away from the center of gravity and that the inkbowl F with its charge of ink has an increasing leverage through H upon the bellows spring, K, as the moment of force changes. The result is that the increments of pressure required to move the pen across the succeeding intervals of the chart grow less and less as the pen moves toward the periphery of the chart. The greater the weight of the pen and its cargo of ink, the farther the pen will move under any given increment of pressure. If however the weight be constant the discrepancy can be compensated for in the calibration of the chart. But with the type of pen, F, the weight is a variable and no sort of counterweight is a variable and no sort of counterweight is a variable and no sort of counterweight arrangement on the pen arm or balancing arrangement on the pen arm or calibration of the chart will offset this variable. We found that with this type of pen the errors in our records were as great as 5 per cent. and to eliminate the trouble we devised the arrangement shown in Figs. 5 and 5ᴬ. The recording pen as shown in Figs. 5 and 5ᴬ is preferably of glass drawn down to a fine point having a capillary opening through which the ink is discharged upon the chart. D is a very small rubber tube having a minute bore and is slipped over the tapered shank of the pen, E². D depends downward to the eye of the retainer, E, from whence it rises to the reservoir, A, connecting with the tube, C, which dips into the ink, B. It is only necessary to start a flow of ink through the tube, D, to the pen, E². Thereafter the flow is continued unceasingly until all of the ink in the reservoir is exhausted. The rate of flow may be increased or diminished by raising or lowering the reservoir, thereby changing the head. In all circumstances the weight upon the pen arm will be constant.

Figure 6:
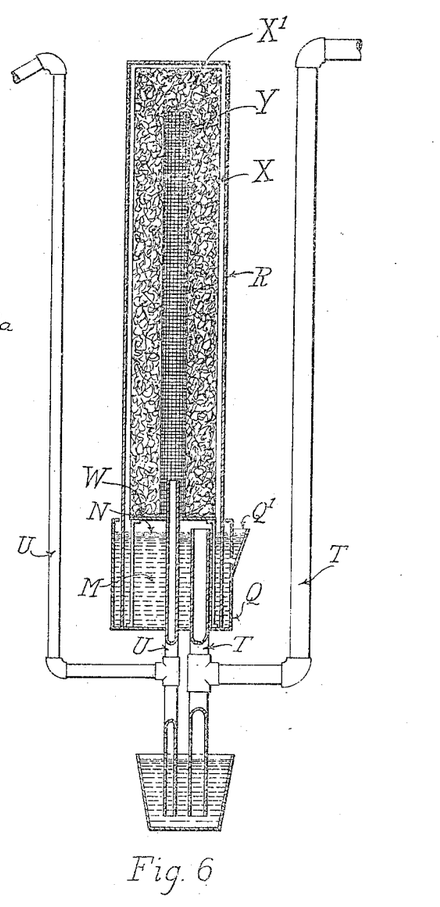
Fig. 6 shows a filter for separating foreign matter from the gas to be analyzed.

In Fig. 6 we show a filter for removing soot or other foreign substances from the gas to be analyzed. Q is a tank, having an overflow, Q¹. R is a bell, or gas-holder, which stands in Q and incloses the filter proper. Gas is conducted to the filter through the pipe, T, and from the filter to the analyzer through the pipe U. The filtering material X¹ which may be cotton waste or any other suitable substance is packed in the wire mesh basket, X, around and over the wire mesh cylinder, Y. X and Y are supported upon the plate, W², through which the tube, U, passes. Q is partly filled with water, M, on the surface of which a quantity of oil, N², is carried to prevent evaporation. The tube, U, is connected with pipe 5 of the analyzer, Fig. 1, and T goes to the source of gas supply. Both T and U are trapped as shown to catch the water of condensation and prevent water seals from forming in the pipes.

The apparatus operates as follows, it being assumed for the purposes of description that the gases of combustion escaping from a steam boiler furnace are to be taken and that the percentage of $CO_2$ contained in the gases is to be determined and recorded, also the draft or vacuum in the boiler furnace or flue: The pipe, T, of the filter, Fig. 6, is inserted in the flue or "pass" of the boiler as near as possible to the point where the gases leave the heating surfaces. The pipe 38ᵃ, Fig. 1, is led to the point where it is desired to measure the draft,—preferably the furnace in which the fuel is burned. The valves, $V^1$, $V^2$ and $V^3$ are charged with mercury as shown in Fig. 2,—also the cup, M, Fig. 1. The reservoir, 33, and the compartment, 11, Fig. 1, are filled with distilled water. The vessels, 14, 15 and 16 and their connecting tubes are filled with liquids as indicated in Fig. 1, viz., 18, a solution of potassium hydroxid,—17 a light mineral oil and 19, distilled water. The water is first introduced through the tube, 20, the plug, 21, being removed for the purpose. The potash solution is next introduced through the tube, 21ᵃ, the plug, 21ᵇ, being removed for the purpose. The oil is lastly introduced through tube 20, and the plugs, 21 and 21ᵇ replaced. When it is desired to renew the potash solution a measured quantity is siphoned out through the tube, 21ᵃ, and fresh solution introduced. The necessary water connections are next made with tube 1 and a proper flow instituted through pipe 1 by adjustment of the valve, 1ᶜ. Gas will be entrained in the water flowing down the bent tube, 2, and a suction thereby applied upon the pipe, 6, which will be communicated through 8 and 5 and thence to the boiler from whence the gas is to be taken. We have found that the "pull" of the aspirator is greatly increased if the water is delivered into the gas-pipe, 2, through a constricted opening and at right angles to the gas pipe. This causes the water to be projected with some force against the walls of the pipe, 2, with the result that the water stream is "broken" and the trapping effect of the water upon the gas greatly increased. In aspirators or ejectors of this type the practice heretofore has been to introduce the gas at right angles to the water flow, or in other words to flow the water by the opening through which the gas is introduced. By reversing the operation and projecting the water into the gas passage we have more than doubled the pulling effect of the aspirator. We believe that the arrangement as here shown and described is new to the art. The aspirator is working properly when the water appears "frothy" in the tube 2. The tank, 30, is next filled with water by opening the valve, 1ᵇ. The apparatus is now ready for continuous operation and the gas is flowing rapidly from the boiler to and through the analyzer. The water discharged from the aspirator, 2, is delivered to the stand-pipe, 3, and accumulates therein, also in compartment, 12ᵃ. When the opening, 12ᵇ, is sealed with water the rising head of water in 3 exerts a static pressure upon the air in 12ᵃ and 11ᵃ. The air acts as a piston between the water, 12, and the distilled water, 11,—the latter being displaced through the tubes, 5ᵃ and 6ᵃ into 5, 6, 7 and 8. When the water, 11, reaches and seals the tubes 5 and 6 at the points, 5ᵇ and 6ᵇ, the gas ceases to flow through these tubes and is short-circuited from 5 to 6 through the liquid valve 10 which is sealed with water or oil. The gas trapped above the points, 5ᵇ and 6ᵇ will be at something less than atmospheric pressure, but as the water rises farther toward 8 atmospheric pressure will be reached and maintained until the level of the water reaches 8ᵇ,—the surplus gas above the quantity called for by the gas-measuring vessel, 8, being displaced into the tube, 7, and the expansion gas bag, 9. When the water rises in tubes 5, 6 and 7 beyond 8ᵇ, the pressure in 8 is increased above that of the atmosphere and the gas is forced through the tube, 8ᵃ, displacing the potash solution, 18, in 14. The potash displaces the oil, 17, and the latter in turn displaces the water, 19. The water rises in 16ᵃ and 35 until the tube, 36, is sealed at 36ᵃ whereupon a pressure is exerted upon the air trapped in 35ᵇ. This pressure is fixed by the height to which the water rises in 36 and it is communicated to the gage and registered by the recording pen upon the chart, G. The apparatus is so calibrated that the pressure applied to and registered by the gage is inversely as the percentage of the gas absorbed. If no absorption takes place,— if there is no $CO_2$ present—there will be a maximum displacement of the liquid, 18, followed by maximum displacements of the liquids, 17 and 19 with maximum rise of 19 in tube 36. The calibration should be such that under these circumstances the recording pen would move entirely across the chart from the starting line, Z to the line Z¹. Scale 36ᵇ may serve as an indicator and should be calibrated to agree with the recording gage. The apparatus may be calibrated to cover any range of gas absorption required. For example if it is used to determine the percentage volume of $SO_2$ in the gases from a sulfur ore roasting furnace the range need not exceed 10 per cent. as this figure may be taken as the maximum for the SO content of the gases. To calibrate the analyzer for such conditions, the tube 36, which is movably fixed in 35 would be so adjusted that the water, 19, would just reach and seal the tube 36 at 36ᵃ when 10 per cent. of the gas passed into 14 from 8 should be absorbed. It will be seen that the position of the lower end of 36 viz. 36ᵃ has a definite relation to the starting point, 19—1, of the water, 19, in tube 16ᵃ. The greater the range of gas absorption to be covered the sooner the water must reach and seal 36ᵃ when the gas sample is being passed over. If a range of gas absorption as high as 100 per cent. is to be covered the tube, 36, may be dispensed with altogether, as it would be necessary under such circumstances to register the slightest displacement of the water, 19. It will be seen that calibration of the analyzer may also be effected by changing the position of the starting point, 19—1, the tube 36 being immovably fixed in 35. It will also be seen that when once this starting point has been established it is essential that the liquid, 19, be brought exactly to this point at the termination of each cycle of operation, otherwise the records would be inaccurate. To bring the liquid to the starting point on each operation of the apparatus requires constant adjustment, because the volumes of the liquids, 17, 18 and 19 are affected, 1st, by changes of temperature, 2nd, by evaporation, 3rd, by the condensation of water vapor carried by the gases. We correct the levels of the liquids automatically in our apparatus in the following manner: Tube 16ᵃ is cross-connected with tube 26 by tubes 27 and 28 through valve, V¹. Tube 26 is provided with an overflow, 38, which through tube 26ᵃ leads to the bottom of reservoir 33, which is filled with distilled water, 34. The arrangement is such that when water rises in the stand-pipe, 3, a pressure is applied through tube, P¹, upon the mercury in 29ᵈ, displacing the mercury into tubes 27 and 28, sealing same. A similar pressure is at the same time exerted through P¹ and P² upon the water in 33, displacing same through 26ᵃ into 26. While these displacements are taking place the gas sample is forced from 8 into 14 and as a result the water, 19, is displaced into 35 and a record made by the gage as previously described. Upon the water reaching its maximum height, 46, in stand-pipe, 3, the siphon, 4, overflows and the water level falls, thereby relieving the pressures and permitting all of the liquids, including the mercury in V¹ and V², to return to their normal levels. The residual gas in 14 flows back from 14 to 8 through the tube 8ᵃ. It is immediately evacuated from 8 by the inflow of fresh gas. The arrangement is such that the mercury seal in 27 and 28 is broken before the head of water in 26 falls to the overflow point, 38. This permits a flow of water in either direction from 35 and 16ᵃ to 26 with the result that the water levels in 16ᵃ and 26 fall together, —the final level of the water in 16ᵃ being fixed by the overflow point, 38. If there has been any increase in the volumes of the liquids, 19, 17 and 18, this increase will be compensated for by a flow of water from 16ᵃ to 26, and if there has been a decrease, the flow will be in the opposite direction, viz. from 26 to 16ᵃ. In any event the water will be fixed in 16ᵃ at the exact level called for by the calibration of the apparatus, viz. the point, 19—1. For the purpose of facilitating adjustment it is necessary that some means be provided for raising or lowering the point of normal level, or what we term the "starting point," 19—1, with reference to 36ᵃ. This can be accomplished by raising or lowering the over-flow point, 38, or what amounts to the same thing, by raising or lowering 35 with the tube 36 through elongating or shortening the connection, 16ᵇ, between 35ᵃ and 16ᵃ. A ready method of making the adjustment in the latter manner is by the sleeve, 16ᵇ, into which the tubes, 35ᵃ and 16ᵃ, telescope. Any arrangement by means of which the starting point, 19, 1, may be altered, viz. either raised or lowered, will answer the purpose. Simultaneously with the sealing of tubes 27 and 28 by V¹, tube 38ᵃ is sealed by V³, pressure being applied to the mercury in both V¹ and V³, through the same tube, viz. P¹. The closing of V³ shuts off the bellows spring, K, from all affecting pressures except that communicated through 37 from 35ᵇ.

In boiler furnace practice it is desirable to operate with the highest possible percentage of $CO_2$ in the flue gases, consistent with complete combustion. As a means of arousing the attention of the operating fireman when the $CO_2$ percentage is below the demands of good practice we employ the alarm device shown in Fig. 1. The recording pen, as previously stated, moves from the starting line, z, toward the periphery of the chart, scoring exactly upon the zero line, Z¹, when there is no absorption of gas by the liquid, 18. To produce an alarm by an annunciator bell, or otherwise, it is necessary only to so adjust the level of the mercury, M, that the dipping needle, N, will make contact and complete an electrical circuit when the recording pen, F, reaches the point on the scale, G, where it is desired to arrest the attention of the fireman. To fix the mercury level the cup is raised or lowered by means of the screw, S. When the water level in 3 reaches the point, 46 and the siphon overflows, the discharge water is evacuated into tank, b, Fig. 3, and rising in the tank compresses the air in d, closing the valve, V². Closure is continued until the water is evacuated from b by the siphon c. The arrangement is such that for a short interval following the evacuation of water from tank 3, the recording gage will be subjected only to such negative pressures as are exerted through, 38ᵃ, the valve, V³, being open. We are accordingly able to produce records of both draft and $CO_2$ or other absorbable gas, alternately with the same pen upon the same chart.

As a means of simplifying the apparatus we have successfully employed the device shown in Fig. 4 in substitution for the parts, 14, 15 and 16. The absorber liquid, 18, is contained in the vessel, A¹, and the bulb, B², the latter being packed with steel wool fibers. The bag, H⁴, is filled with distilled water, 19. G¹ is connected with the gas measuring vessel, 8. The arrangement is such that when gas is forced into B² from 8 the liquid, 18, is displaced, deflating the bag, H⁴, which in turn displaces the water 19 into 35. The tube, D², having the scale, D¹, may be employed as an accessory if desired, serving as an indicator of the gas percentage, the displacement into said tube, as into 35, being inversely proportional to the volume of gas absorbed.

We claim—

1. A gas analyzer consisting of connected gas measuring and absorber vessels, a liquid chemical in said absorber vessel and means for periodically bringing said liquid chemical to normal level.

2. A gas analyzer consisting of connected gas measuring and absorber vessels, a liquid chemical in said absorber vessel and automatic means for periodically bringing said liquid chemical to predetermined normal level.

3. A gas analyzer consisting of connected gas measuring and absorber vessels, a liquid in said absorber vessel and automatic means for periodically adding to or subtracting from said liquid an amount equal to any increase or decrease in the volume of said liquid.

4. A gas analyzer consisting of connected gas measuring and absorber vessels, a liquid in said absorber vessel, means for passing gas back and forth between said vessels and automatic means for periodically bringing said liquid to predetermined normal level when the gas is returned from the absorber vessel to the measuring vessel.

5. A gas analyzer consisting of connected gas measuring and absorber vessels, a liquid in said absorber vessel, a tube connected with said absorber vessel, a liquid in said absorber vessel and said tube and means for periodically bringing the liquid in said tube to normal level.

6. A gas analyzer consisting of connected gas measuring and absorber vessels, a liquid chemical in said absorber vessel, a tube connected with said absorber vessel, a liquid in said tube, a movable body between said liquid and said liquid chemical, a pipe having a valve therein connecting said tube with a liquid reservoir.

7. A gas analyzer consisting of connected gas measuring and absorber vessels, a liquid chemical in said absorber vessel, a tube connected with said absorber vessel, a liquid in said tube, a movable body between said liquid and said liquid chemical, a pipe having a valve therein, connecting said tube with a liquid reservoir and means for automatically operating said valve.

8. A gas analyzer consisting of connected gas measuring and absorber vessels, a liquid chemical in said absorber vessel, a tube connected with said absorber vessel, a liquid in said tube, a pipe connecting said tube with a liquid reservoir, a liquid reservoir between said first mentioned reservoir and said tube and means for forcing liquid from said last mentioned reservoir into said pipe.

9. A gas analyzer consisting of connected gas measuring and absorber vessels, a liquid in said absorber vessel, means for periodically bringing said liquid to predetermined normal level and means for causing gas to flow normally through said measuring vessel and periodically from said measuring vessel to said absorber vessel.

10. A gas analyzer consisting of connected gas measuring and absorber vessels, a common jacketing chamber surrounding said vessels, a liquid in said absorber vessel and means for periodically bringing said liquid to predetermined normal level.

11. A gas analyzer consisting of connected gas measuring and absorber vessels, a common jacketing chamber surrounding said vessels, a tube leading from said absorber vessel, a liquid in said absorber vessel and said tube, means for bringing the liquid in said absorber vessel to predetermined normal level and means for causing gas to flow normally through said measuring vessel and periodically from said measuring vessel to said absorber vessel.

12. A gas analyzer consisting of connected gas measuring and absorber vessels, a chemical in said absorber vessel, a tube connected with said absorber vessel, a liquid in said tube, a liquid reservoir having a tube connected therewith, an overflow in said tube and a pipe connection between said first mentioned and said last mentioned tubes.

13. A gas analyzer consisting of connected gas measuring and absorber vessels, a chemical in said absorber vessel, a tube connected with said absorber vessel, a liquid in said tube, a liquid reservoir having a tube connected therewith, an overflow in said tube, a pipe connection between said tubes below said overflow and the point of normal level of the liquid in said last mentioned tube and means for opening and closing said pipe connection.

14. A gas analyzer consisting of connected gas measuring and gas absorbing vessels, a chemical in said absorber vessel, a tube connected with said absorber vessel, a liquid in said tube, a liquid reservoir having a tube connected therewith, an overflow in said tube, a pipe connection between said tubes below said overflow and the point of normal level of the liquid in said last mentioned tube and means for causing the liquids to rise and fall in said tubes.

15. A gas analyzer consisting of connected gas measuring and absorber vessels, a chemical in said absorber vessel, a tube connected with said absorber vessel, a liquid in said tube, a liquid reservoir having a tube connected therewith, a cross-connection between said tubes, a valve in said cross connection, means for opening and closing said valve, and means for forcing gas from said measuring vessel into said absorber vessel displacing said first mentioned liquid into said first mentioned tube and for synchronously forcing said second mentioned liquid from said reservoir into said second mentioned tube.

16. A gas analyzer consisting of connected gas measuring and gas absorber vessels, a chemical in said absorber vessel, a tube connected with said absorber vessel, a liquid in said tube, a liquid reservoir having a tube connected therewith, an overflow in said tube and means for bringing the level of the liquid in said first mentioned tube into the same horizontal plane as the overflow in said last mentioned tube.

17. A gas analyzer consisting of connected gas measuring and absorber vessels, a chemical in said absorber vessel, a tube connected with said absorber vessel, a liquid in said tube, a liquid reservoir having a tube connected therewith, means for periodically altering the levels of the liquids in said tubes and means for bringing said liquids after such alteration to a predetermined normal level.

18. A gas analyzer consisting of connected gas measuring and absorber vessels, a liquid chemical in said absorber vessel, a tube connected with said absorber vessel, a liquid in said tube, a movable body separating said liquid chemical and said liquid in said tube, a liquid reservoir having a tube connected therewith and means for bringing said liquids in said tubes to predetermined common normal levels.

19. A gas analyzer consisting of gas measuring and absorber vessels, a liquid chemical in said absorber vessel, a tube connected with said absorber vessel, a liquid in said tube, a movable body separating said liquid chemical from the liquid in said tube, a liquid reservoir having a tube connected therewith, a cross connection between said tubes, a valve in said cross connection, means for opening and closing said valve, means for altering the levels of the liquids in said tubes and means for restoring said liquids to a common predetermined normal level.

20. A gas analyzer consisting of gas measuring and absorber vessels, a liquid chemical in said absorber vessel, a tube connected with said absorber vessel, a liquid in said tube, a movable body separating said liquid chemical from the liquid in said tube, a liquid reservoir having a tube connected therewith, an overflow in said tube, a cross connection between said tubes, a valve in said cross connection, means for bringing the liquids in said tubes to a common level with said overflow and a common pressure means for moving gas from said measuring vessel to said absorber vessel displacing the liquid chemical therefrom, for altering the position of said separating movable body and for raising the levels of the liquids in said tubes.

21. An automatic gas analyzer comprising a water aspirator for drawing gas to and through the gas measuring chamber of said analyzer, an absorber vessel connected by tube with said gas measuring chamber, a liquid chemical in said absorber vessel, means for automatically bringing said liquid chemical to predetermined normal level, a closed vessel for receiving the discharge from said water aspirator, a tube connection between said vessel and said gas measuring chamber and a siphon for emptying said vessel.

22. In an automatic gas analyzer, the combination of a gas pump, a gas measuring chamber, a gas absorbing chamber, connected with said gas measuring chamber, a liquid chemical in said gas absorbing chamber, a chamber having a movable body therein connected with said gas absorbing chamber, a tube connected with said chamber, a liquid in said chamber and said tube, pressure means for forcing gas from said measuring chamber into said absorber chamber and automatic means for correcting the levels of said liquid chemical and said other liquids by increasing or decreasing the volume of the liquid in said tube.

23. An automatic gas analyzer consisting of a gas measuring chamber, a pump for drawing gas to and through said gas measuring chamber, an absorber vessel connected with said measuring chamber, a liquid chemical in said absorber vessel, means for periodically correcting the level of said liquid chemical and means for periodically forcing water into said measuring chamber displacing the gas therefrom into said absorber vessel.

24. An automatic gas analyzer consisting of a gas measuring chamber, a pump for drawing gas to and through said gas measuring chamber, an absorber vessel connected with said measuring chamber, a liquid chemical in said absorber vessel, means for periodically correcting the level of said liquid chemical, means for periodically forcing water into said measuring chamber displacing the gas therefrom into said absorber vessel and a recording gage for measuring the volume of the chemical so displaced.

25. An automatic gas analyzer consisting of a gas measuring chamber, a pump for drawing gas to and through said gas measuring chamber, an absorber vessel connected with said measuring chamber, a chemical in said absorber vessel, a tube connected with said absorber vessel, a liquid in said tube, means for periodically correcting the level of said liquid, and means for periodically forcing water into said measuring chamber displacing the gas therefrom into said absorber vessel upon said chemical displacing the liquid in said tube and a recording gage for measuring the volume of the liquid so displaced.

JOSEPH W. HAYS.
CHARLES W. HAYS.

Witnesses:
E. K. UEBE,
HARVEY G. HAYS.